United States Patent
El Khiati et al.

(10) Patent No.: US 6,905,991 B1
(45) Date of Patent: Jun. 14, 2005

(54) SODA-LIME-SILICA GLASS COMPOSITIONS AND APPLICATIONS

(75) Inventors: Nathalie El Khiati, Deuil la Barre (FR); René Gy, Bondy (FR); Eric Le Bourhis, Sarcelles Village (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 09/242,803

(22) PCT Filed: Mar. 12, 1998

(86) PCT No.: PCT/FR98/00508

§ 371 (c)(1), (2), (4) Date: Feb. 24, 1999

(87) PCT Pub. No.: WO98/40320

PCT Pub. Date: Sep. 17, 1998

(30) Foreign Application Priority Data

| Mar. 13, 1997 | (DE) | 197 10 289 |
| Apr. 30, 1997 | (FR) | 97 05364 |
| Jun. 17, 1997 | (FR) | 97 07521 |

(51) Int. Cl.$^7$ .......................... C03C 3/078; C03C 3/087
(52) U.S. Cl. .......................... 501/70; 501/72
(58) Field of Search .................... 501/70, 72

(56) References Cited

U.S. PATENT DOCUMENTS

| 3,984,252 | A | * | 10/1976 | Kiefer | 501/66 |
| 5,599,754 | A | * | 2/1997 | Maeda et al. | 501/70 |
| 5,656,558 | A | * | 8/1997 | Brix et al. | 501/67 |
| 5,676,722 | A | * | 10/1997 | Seidel et al. | 65/111 |
| 5,776,844 | A | * | 7/1998 | Koch et al. | 501/70 |
| 5,858,897 | A | * | 1/1999 | Maeda et al. | 501/70 |
| 5,876,472 | A | * | 3/1999 | Gros et al. | 501/66 |
| 5,925,583 | A | * | 7/1999 | Yoshii et al. | 501/72 |
| 5,932,503 | A | * | 8/1999 | Kim et al. | 501/70 |
| 5,990,023 | A | * | 11/1999 | Siedel et al. | 501/70 |
| 6,054,401 | A | * | 4/2000 | Sugiura et al. | 501/70 |
| 6,063,718 | A | * | 5/2000 | El Khiati et al. | 501/70 |

FOREIGN PATENT DOCUMENTS

| DE | 43 25 656 | 2/1996 |
| JP | 08 290 939 | 11/1996 |
| WO | 96 01792 | 1/1996 |
| WO | 96 11887 | 4/1996 |
| WO | 98 22403 | 5/1998 |

OTHER PUBLICATIONS

Chemical Abstracts 6001 114(1991) Apr. 8, No. 14.

* cited by examiner

*Primary Examiner*—David Sample
(74) *Attorney, Agent, or Firm*—Oblon, Spivak, McClelland, Maier & Neustadt, P.C.

(57) ABSTRACT

The subject of the invention is a glass composition of the silica-soda-lime type, intended for the manufacture of substrates or sheets, the said glass composition having a φ coefficient of between 0.50 and 0.85 N/(mm$^2$.° C.) and a working point of less than 1200° C.

13 Claims, No Drawings

SODA-LIME-SILICA GLASS COMPOSITIONS AND APPLICATIONS

TECHNICAL FIELD

The invention relates to silica-soda-lime glass compositions suitable for being converted into a ribbon of glass from which may be cut sheets which, in particular after treatment, exhibit heat resistance.

Such sheets may more particularly be used for producing fireproof glazing panels or for serving as substrates for the manufacture of plasma screens, electroluminescent screens and cold-cathode screens (field-emission display).

With regard more particularly to glazing panels which are fire resistant according to the G fire resistance classes, these consist of a thermally toughened sheet of glass and have properties of a safety glass.

BACKGROUND ART

Glazing panels fire resistant in accordance with the G fire resistance classes, together with their frames and their fittings, must offer resistance, in a fire withstand test according to the standard DIN 4102 or to the standard ISO/DIS 834–1, for a certain time, to the passage of the fire and smoke. During this time, the glazing panels must neither break, under the effect of the stresses which occur as a result of the temperature gradients between the surface of the glazing panel in contact with the heat and the embedded edge, nor exceed their softening point, since they would lose their stability and would thus expose the opening. They are ranked in the fire resistance classes G 30, G 60, G 90 or G 120 depending on the time in minutes for which they withstand fire.

In general, fire-resistant glazing panels are held in frames which protect, to a greater or lesser extent, the edge of the said glazing panels from the effect of the heat. The temperature gradient which thus occurs between the middle of the glazing panel and the edge generates considerable tensile stresses in the marginal region and results in the destruction of the glazing panels if special measures are not taken to compensate for these tensile stresses. These measures consist of thermally toughening the glazing panels, this toughening making it possible to induce large initial compressive stresses in the marginal region. The thermal toughening gives the glazing panel additional properties of a safety glass when the toughening is carried out in such a way that, should the glazing panel break, it would do so by fragmenting into tiny pieces.

The initial stress state is usually determined by means of the flexural/tensile strength obtained by the toughening operation, in accordance with the standard DIN 52303 or to the standard EN 12150. Experiments have in this case shown the need to guarantee a flexural/tensile strength of at least 120 N/mm$^2$ so that the glazing panel can withstand the tensile stresses generated by the temperature gradients at the edge. Given that untoughened glazing panels have a basic flexural/tensile strength of approximately 50 N/mm$^2$, this means that it is necessary to increase this strength, by toughening, by at least 70 N/mm$^2$. The value of this increase in the flexural/tensile strength corresponds directly to the value of the initial compressive surface stresses.

It is also possible to increase the fire resistance time by increasing the depth of insertion of the glazing panel in the frame. In the case of a flexural/tensile strength of the glazing panel of 120 N/mm$^2$ and an insertion depth of 10 mm, the glazing panel conforms, for example, to the fire resistance class G 30, while an insertion depth of 20 mm allows it to achieve the fire resistance class G 90.

Glazing panels made of the usual float glass (soda-lime-based silica glass) may be suitably toughened by means of conventional toughening plants, given that these glass compositions have relatively high thermal expansion coefficients, greater than 85×10$^{-7}$ K$^{-1}$. The usual float glass allows flexural/tensile strengths possibly ranging up to 200 N/mm$^2$ to be achieved. Under the effect of the tensile stresses generated by the temperature gradients, the glazing panels consequently do not break if the insertion depth is approximately 10 mm, but they lose their stability because of their relatively low softening temperature of approximately 730° C. Toughened glazing panels made of float glass therefore conform, under standard installation conditions, at the very most to the fire resistance class G 30.

However, monolithic glazing panels of fire resistance class G 60 and higher classes are also known. These glazing panels consist of glass compositions having a high softening point of greater than 815° C. and consequently have a long resistance time in a fire withstand test. In this case, borosilicate- and aluminosilicate-based heat-resistant glasses prove to be particularly suitable. However, these types of glass must also be toughened thermally in order to be able to withstand the high tensile stresses which occur in the marginal region in a fire withstand test.

The use of thermal toughening for fireproof glazing panels whose glass compositions are based on heat-resistant borosilicate or on heat-resistant aluminosilicate is known from the documents DE 2,313,442 B2 and U.S. Pat. No. 3,984,252. According to these documents, only suitable for toughening are glasses for which the product of the thermal expansion α and the modulus of elasticity E reaches 1 to 5 kg·cm$^{-2}$·° C., i.e. borosilicate- or aluminosilicate-based glasses having a thermal expansion of α$_{20-300}$=30 to 65×10$^{-7}$ ° C.$^{-1}$. However, the necessary toughening at the edge of these glazing panels cannot be carried out by means of conventional air-toughening plants but requires a special process in which the glazing panels are placed, during the heating, between slightly smaller ceramic tiles in such a way that the edge of the glazing panel extends beyond the ceramic tiles and is therefore cooled more rapidly, while the middle of the glazing panel cools more slowly due to the effect of the ceramic tiles. The necessary toughening at the edge may, to be sure, be achieved in this way, but the glazing panels thus manufactured do not have any safety-glass properties.

It is known from the document EP-A-638,526 to use, for the manufacture of monolithic fireproof glazing panels, glass compositions which have a thermal expansion coefficient α of between 30 and 60×10$^{-7}$ K$^{-1}$, a φ coefficient of between 0.3 and 0.5 N/(mm$^2$·K), a softening point (=temperature for a viscosity of 10$^{7.6}$ poise) of greater than 830° C. and a working point (=temperature for a viscosity of 10$^4$ poise) of between 1190° and 1260° C. The φ coefficient or specific thermal stress is the specific parameter of the glass calculated from the thermal expansion coefficient α, the modulus of elasticity E and Poisson's ratio $\mu$ according to the formula φ=α.E/(1-$\mu$). Glazing panels having these physical properties may acquire, in a conventional air-toughening plant, both the initial compressive stresses necessary at the edge and the toughening stresses exerted over the entire surface and necessary for obtaining fragmentation into tiny pieces, so that no particular measurement is necessary in respect of the toughening operation and so that the manufacturing process is thereby considerably simplified.

However, glazing panels having these physical properties necessarily contain $B_2O_3$, $Al_2O_3$ and $ZrO_2$ in quantities which complicate the melting process and the conversion process. These glazing panels thus cannot be manufactured using the floating process which has proved to be exceptionally economical, given that their conversion point is too high and that the melting furthermore requires special measures.

Borosilicate-based glass compositions are known, from the document FR-2,389,582, which are provided, to be sure, for use in fireproof glazing panels which, because of their relatively low conversion point, may melt during the floating process and also be toughened by means of conventional toughening plants. However, these glasses contain from 11.5 to 14.5% of $B_2O_3$ and also have physical properties similar to those of the glasses known from the document EP-A-638,526. Even in the case of these glasses, the initial compressive stresses and the flexural or the tensile strength which may be achieved by air toughening are limited to relatively low values and these glasses also have the known difficulties and drawbacks when melting borosilicate-based glasses.

With regard to the manufacture of emissive screens of the plasma-screen type, the substrate is subjected to several heat treatments for the purpose of stabilizing the dimensions of the said substrate and of fixing a series of layers of various compounds, such as enamels, deposited on its surface. Fixing these relatively thick layers requires the substrate to be heated to temperatures greater than 550° C. If the expansion coefficient of the silica-soda-lime glass used is of the same order of magnitude as that of the compounds deposited on its surface, its temperature withstand is insufficient and it is necessary to place it on a ground slab during the heat treatments in order to avoid any deformation.

Novel families of glass compositions have been developed and described in the patent WO-96/11887 so as to mitigate these drawbacks, especially so as to be able to manufacture sheets or substrates undergoing virtually zero deformation during heat treatments of the order of 550 to 600° C. and capable of generating, by thermal toughening, stress levels comparable to those obtained with standard silica-soda-lime glass.

However, it appears that these glasses may undergo breaks during the deposition of certain layers, including when the methods of depositing these layers result in local temperatures of the glass which do not exceed about a hundred degrees Celsius.

The inventors have thus sought to remedy these breaks, which, albeit infrequent, disrupt the manufacturing plants.

SUMMARY OF THE INVENTION

The subject of the invention is novel glass compositions allowing the manufacture of substrates whose deformation remains virtually zero when they are subjected to temperatures of about 600° C. and which do not deteriorate when depositing layers on their surface, i.e. which do not break immediately and which do not have flaws which may lead to an eventual break.

The subject of the invention is also novel glass compositions for the manufacture of glazing panels which are fire resistant according to the G fire resistance classes which, on the one hand, may be thermally toughened by means of conventional plants and which, on the other hand, can be melted without any economic and/or technological problems and which can be converted into flat glass using the float process.

The subject of the invention is also glass compositions which allow the manufacture of glazing panels whose appearance and optical properties are comparable to those of known float glass.

These objects are achieved according to the invention by a glass composition intended for the manufacture of thermally stable substrates, the said glass composition having a thermal stress factor or $\phi$ coefficient of between 0.5 and 0.85 N/(mm$^2 \cdot$° C.) and a working point or conversion point (viscosity=$10^4$ dPa.s) of less than 1200° C.

DETAILED DESCRIPTION OF THE INVENTION

As mentioned previously, the $\phi$ coefficient is defined according to the relationship:

$$\phi = \alpha \cdot E/(1-\mu),$$

where
- $\alpha$: expansion coefficient
- E: modulus of elasticity
- $\mu$: Poisson's ratio.

The modulus of elasticity and Poisson's ratio are determined by the following test: a glass test piece having the dimensions 100×10 mm$^2$ and a thickness of less than 6 mm is subjected to 4-point bending in which the outer bearing points are separated by 90 mm and the inner bearing points 30 mm. A strain gauge is bonded to the centre of the glass plate. The main strains (in the length of the plate and in its width) are deduced therefrom. The stress applied is calculated from the force applied. The equations between the principal stress and strains allow the modulus of elasticity and Poisson's ratio to be determined.

According to a preferred variant of the invention, the glass compositions according to the invention have a softening point (viscosity=$10^{7.6}$ poise) of greater than 750° C. Also preferably, the working point of the glass compositions according to the invention is less than 1190° C.

In an advantageous variant of the invention, the thermal expansion coefficient $\alpha_{20-300}$ of the glass compositions is between 60 and 88×10$^{-7}$° C.$^{-1}$ and preferably less than 85×10$^{-7}$° C.$^{-1}$.

Also preferably and more particularly in the case of the production of fireproof glazing panels, the glass composition according to the invention satisfies the relationship:

$$\phi^2 \cdot c/a < 2 \text{ MPa}^2/° \text{ C.}^2,$$

The "c/a" value is defined by the brittleness test described below: the glass is firstly annealed so as to remove the residual stresses. The glass is heated at its annealing point for 1 hour and then cooled at 2° C./min to ambient temperature. The glass test piece to be tested is indented with a 200 g load for 30 seconds at ambient temperature. The diagonals of the Vickers impression and the size of the radial cracks (Lawn and Marshall, J. Am. Cer. Soc. 62, 347–350 (1979); Sehgal et al., J. Mat. Sci. Let. 14, 167–169 (1995)) are measured 72 hours after indentation. The c/a ratio, i.e. length of the radial cracks/semi-diagonal, is measured on 10 indentations so as to obtain sufficient statistics.

Preferably, the glass composition according to the invention satisfies the relationship:

$$\phi^2 \cdot c/a < 0.07 \text{ MPa}^2/° \text{ C.}^2,$$

Also preferably, the product $\phi^2 \cdot c/a$, is greater than 1 and preferably less than 1.8.

In one embodiment of the invention and more particularly in the case of the production of substrates for plasma screens, the composition has a strain point of greater than 570° C. and preferably greater than 600° C. More particularly also for applications of the plasma-screen type, the φ coefficient is between 0.75 and 0.85 and preferably less than 0.8.

For fireproof glazing panel applications, the φ coefficient is advantageously less than 0.8 and preferably greater than 0.7.

The inventors have been able to demonstrate that glasses having the properties in accordance with the invention may not only melt relatively well but, in addition, are particularly suitable for the manufacture of monolithic fireproof glazing panels insofar as, even in the case of conventional air toughening, they have a flexural/tensile strength markedly greater than that of the known borosilicate- and aluminosilicate-based glasses for the manufacture of fireproof glazing panels. By virtue of their higher thermal expansion coefficient and their higher φ coefficient, it is possible in fact to obtain, by means of standard toughening plants, flexural/tensile strengths markedly greater, i.e. markedly greater initial compressive stresses, so as to increase substantially the resistance to the temperature difference which may exist between the embedded cold edge and the hot centre of the glazing panel. Furthermore, it was apparent that the resistance of these glasses was entirely sufficient for meeting the fire resistance class G 30 even in the case of a depth of insertion in the frame of 10 mm. However, the glasses used in accordance with the invention also make it possible to achieve superior fire resistance classes of G 60, G 90 or even G 120 when, as required, thicker glazing panels are used and a frame is used in which they are embedded more deeply, i.e. a frame which covers the edge of the glazing panel to a greater extent, for example up to 25 mm.

According to a preferred embodiment of the invention, the glass composition contains the constituents below in the following proportions by weight:

| | |
|---|---|
| $SiO_2$ | 55–75% |
| $Al_2O_3$ | 0–7% |
| $ZrO_2$ | 0–8% |
| $Na_2O$ | 5–10% |
| $K_2O$ | 0–8 |
| CaO | 8–12%. |

According to another embodiment of the invention, the glass composition contains the constituents below in the following proportions by weight:

| | |
|---|---|
| $SiO_2$ | 55–75% |
| $Al_2O_3$ | 0–7% |
| $ZrO_2$ | 0–8% |
| $Na_2O$ | 2–8% |
| $K_2O$ | 2–8% |
| CaO | 4–11% |
| MgO | 0–4%. |

According to another variant and more particularly in the case of the manufacture of substrates for emissive screens, the glass composition according to the invention has a φ coefficient of less than 0.84 N/(mm²·° C.), its strain-point temperature being greater than 507° C. and its electrical resistivity being such that log $\rho_{(250° C.)}$ is greater than 6.6.

It is commonly accepted that glass no longer behaves in a viscous manner below a characteristic temperature called the strain-point temperature which corresponds to a viscosity of the order of $10^{14.5}$ poise. This temperature is therefore a useful reference point for evaluating the temperature withstand of a glass.

It has proved to be the case in tests that, in particular, the combination of these values of strain-point temperature and of the p coefficient allow the production of a substrate or sheet which is thermally stable and undergoes no deterioration or break during the layer-deposition treatment phases. The electrical resistivity values limit, in particular, the diffusion into the glass of, for example, silver ions contained in the layers deposited on the surface of the substrate.

According to a preferred embodiment of the invention, the expansion coefficient of the glass composition is between 65 and 88×10⁻⁷° C.⁻¹. Such values are particularly advantageous for their compatibility with those of the glass frits normally used for producing, for example, barriers for plasma screens.

Also preferably, the expansion coefficient is between 80 and 85×10⁻⁷° C.⁻¹.

A more particularly advantageous glass composition according to the invention, in particular in terms of thermal-break resistance and cost, has a φ coefficient of less than 0.8 N/mm²·° C.) and preferably greater than 0.7 N/(mm²·° C.).

Also to decrease the cost of the glass composition,. the latter advantageously has a strain-point temperature of less than 590° C. and preferably less than 580° C.

Also advantageously, and in particular for decreasing the compaction of the substrate during treatment at relatively high temperatures, the glass composition has a strain-point temperature of greater than 530° C. and preferably greater than 550° C. Such strain-point temperature values allow good control and high precision in the deposition operations which may be carried out at temperatures of about 600° C.

Also preferably, the electrical resistivity of the glass composition according to the invention is such that log $\rho_{(250° C.)}$ is greater than 8; this makes it even more possible to prevent diffusion into the glass of ions originating from the deposited layers.

According to a preferred embodiment of the invention, the glass composition contains the constituents below in the following proportions by weight:

| | |
|---|---|
| $SiO_2$ | 55–75% |
| $Al_2O_3$ | 0–5% |
| $ZrO_2$ | 3–8% |
| $Na_2O$ | 4.5–8% |
| $K_2O$ | 3.5–7.5% |
| CaO | 7–11%. |

The various families of glass compositions according to the invention have, in particular, the advantage of being able to be melted and converted into glass ribbon form using the float process at temperatures close to those adopted for the manufacture of conventional silica-soda-lime glass.

In this regard, $SiO_2$ plays an essential role. In the context of the invention, the $SiO_2$ content must not exceed approximately 75%; above this, the melting of the batch and the refining of the glass require high temperatures which cause accelerated wear of the furnace refractories. Below 55% by weight of $SiO_2$, the glasses according to the invention are insufficiently stable.

Alumina acts as a stabilizer. This oxide to some extent increases the chemical resistance of the glass and increases the strain-point temperature. The percentage of $Al_2O_3$ advantageously does not exceed 5% and more preferably does not exceed 3%, in particular so as not to increase unacceptably the viscosity of the glass at high temperatures.

$ZrO_2$ also acts as a stabilizer. This oxide to a certain extent increases the chemical resistance of the glass and increases the strain-point temperature. The percentage of $ZrO_2$ must not exceed 8% for fear of making the melting operation too difficult. Although this oxide is difficult to melt, it has the advantage of not increasing the viscosity of the glasses according to the invention at high temperatures, in the same way as $SiO_2$ and $Al_2O_3$. The oxide $B_2O_3$ may also be present with a content of at most 3%, and preferably less than 2%. This oxide makes it possible to increase the fluidity of the glass without lowering the strain point.

Overall, the melting of the glasses according to the invention remains within acceptable temperature limits, as long as the sum of the $SiO_2$, $Al_2O_3$ and $ZrO_2$ oxide contents remains less than or equal to 75%. The expression "acceptable limits" should be understood to mean that the temperature of the glass corresponding to log $\eta=2$ does not exceed approximately 1550° C. and preferably 1510° C.

Moreover, it seems that these glasses lead to little corrosion of the refractories of the AZS (alumina-zirconia-silica) type normally used in this type of furnace. These glasses thus guarantee that the operating time of the furnace is optimized.

Moreover, there is a sufficient difference in the glass compositions according to the invention between the glass-forming temperature and its liquidus temperature; this is because, in the float-glass technique in particular, it is important that the liquidus temperature of the glass remain equal to or less than the temperature corresponding to log $\eta=3.5$, which is the case with the glasses according to the invention. This difference is advantageously at least 10° C. to 30° C. These differences or working ranges, which might seem "narrow" for standard silica-soda-lime glasses intended for manufacturing glazing panels, are sufficient here to ensure high-quality forming without adopting excessively extreme conditions for operating the furnace. This is because the glasses are quite special, for applications of the high-tech, high value-added type, such as plasma screens, in which one may "indulge" in very precise control and suitability of the operation of the furnace: "accessible" working ranges are maintained without upsetting the furnace or exposing it to risk.

The influence of the other oxides on the ability of the glasses according to the invention to be melted and floated on a metal bath, as well as their properties, is as follows: the oxides $Na_2O$ and $K_2O$ make it possible to maintain the melting temperature of the glasses according to the invention and their high-temperature viscosities within the limits indicated above. To do this, the sum of the contents of these oxides remains greater than 8% and preferably greater than 10%. Compared with an ordinary silica-soda-lime glass, the simultaneous presence of these two oxides in the glasses according to the invention, sometimes in similar proportions, considerably increases their chemical resistance, more specifically their hydrolytic resistance, as well as their electrical resistivity. Increasing the electrical resistivity of the glasses decreases the diffusion of ions, for example silver ions, coming from the layers deposited on the surface of the substrates, into the glass, especially in the case of the production of plasma screens. Increasing the electrical resistivity of the glasses is also advantageous in certain applications, more specifically when they are used as a substrate for cold-cathode screens. In these screens, surface electric fields are created which cause a localized concentration of electrons. This concentration may cause, in reaction, undesirable migration of the alkali elements if the resistivity of the glass is not high enough, as in the case of an ordinary silica-soda-lime glass.

However, although both types of alkali metal oxides $Na_2O$ and $K_2O$ are necessary, it is preferable, if it is desired to increase their overall content, to favour an increase in the $K_2O$ content, which has the advantage of increasing the fluidity of the glass without lowering the strain point, and hence without excessively compromising the hardness properties of the glass after forming. In addition, $K_2O$ is conducive to decreasing the modulus of elasticity in the glass compositions according to the invention. Preferably, a $K_2O/Na_2O$ weight percentage ratio of at least 1.2, and preferably at least 1.4, is thus advantageously provided.

Provision may also be made to incorporate lithium oxide $Li_2O$ in the glass composition according to the invention, especially as a fluxing agent, with contents of possibly as much as 3% and preferably not exceeding 1%.

The alkaline-earth metal oxides introduced into the glasses according to the invention have the overall effect of raising the strain-point temperature, and it is for this reason that the sum of their weight contents must be at least equal to 12%. Above approximately 20%, the ability of the glasses to devitrify may increase to an extent incompatible with the process of floating on a metal bath. In order to keep the devitrification of the glasses within acceptable limits, their CaO and MgO weight contents must not exceed 12%, preferably 11%, and 5%. The MgO content is preferably equal to or less than 2%.

MgO, CaO and, to a lesser degree, SrO make it possible to increase the strain-point temperature; BaO and SrO make it possible to increase the chemical resistance of the glasses according to the invention as well as their resistivity. The alkaline-earth metals also have the effect of decreasing the melting temperature and the high-temperature viscosity of the glasses.

However, BaO is preferably present with a content of less than 2%; these low contents make it possible to limit the formation of barium sulphate $BaSO_4$ crystals, which would impair the optical quality. Although complete absence of BaO is not excluded, a low content is preferred because of the abovementioned properties of BaO. When BaO is present, it is possible as well to modify the substrate heat-treatment conditions slightly in order to make them less conducive to the formation of $BaSO_4$ crystals.

EXAMPLES

The advantages afforded by the glass compositions according to the invention will be more fully appreciated from the examples given below.

The first examples relate more particularly to compositions intended for the manufacture of fireproof glazing.

A glass composition is made which contains the constituents below in the following proportions by weight, the first column indicating the desired values and the second column the measured values:

|  | Desired | Measured |
| --- | --- | --- |
| $SiO_2$ | 69.60% | 69.60% |
| $Al_2O_3$ | 0.90% | 0.90% |
| $ZrO_2$ | 2.60% | 2.62% |
| $Na_2O$ | 7.10% | 7.07% |
| $K_2O$ | 2.90% | 2.91% |
| CaO | 10.50% | 10.50% |
| MgO | 2.00% | 1.98% |
| SrO | 3.90% | 3.86% |
| $Fe_2O_3$ | <0.15% | 0.055% |
| Other oxides | <0.50%. | 0.505%. |

The glass composition has the following properties:

φ coefficient: 0.77 N/(mm$^2$·°C.)
Expansion coefficient $\alpha_{20-300}$: 76.6×10$^{-7}$ °C.$^{-1}$
Modulus of elasticity: 78.6×10$^3$ N/mm$^2$
Poisson's coefficient: 0.22
φ$^2$·c/a, 1.64 MPa$^2$/°C.$^2$
Softening point: 805° C.
Liquidous temperature T$_{liq}$: 1160° C.
Temperature T$_{logη=2}$, corresponding to a viscosity such that logη=2: 1500° C.
Temperature T$_{logη=3.5}$, corresponding to a viscosity such that logη=3.5: 1176° C.
Temperature T$_{logη=4}$, corresponding to a viscosity such that logη=4: 1100° C.
Relative density 2.59
TL 84.48%
TE 81.46%

It is apparent first of all, from the liquidus temperature, from T$_{logη=2}$, which is the temperature in the melting bath, and from T$_{logη=3.5}$, which is the chosen entry temperature of the glass on the bath of molten metal, that the glass composition may be melted in a melting furnace and that the forming process (float process) on a bath of tin poses no problem.

Sheets of glass were thus produced with thicknesses of between 5 and 10 mm. After having subjected their edges to a polishing treatment, the sheets of glass were toughened, in a horizontal position, in a conventional air toughening plant.

Next, the sheets of glass were fitted in frames with rabbet depths varying from 10 mm to 25 mm.

It has proved to be the case that the glazing panels thus produced according to the invention showed, in fire-withstand tests in accordance with the standard DIN 4102 or the standard ISO/DIS 834–1, that they met the conditions of fire-resistance classes G 30 to G 120 depending on their thickness and on the depth of the frame's rabbet.

The glass composition described below, which may also be melted and obtained in the form of a ribbon using the float technique, may also be used for producing fireproof glazing meeting the conditions of the G fire-resistance classes:

| | |
|---|---|
| SiO$_2$ | 74.40% |
| Al$_2$O$_3$ | 0.95% |
| Na$_2$O | 9.05% |
| K$_2$O | 0.45% |
| CaO | 9.10% |
| MgO | 5.65% |
| Fe$_2$O$_3$ | 0.10% |
| Other oxides | 0.30%. |

It has the following properties:
φ coefficient: 0.71 N/(mm$^2$·°C.)
Expansion coefficient $\alpha_{20-300}$: 75.6×10$^{-7}$ °C.$^{-1}$
Modulus of elasticity: 75.4×10$^3$ N/mm$^2$
Poisson's coefficient: 0.20
φ$^2$·c/a, 1.56 MPa$^2$/°C$^2$.

The glass compositions described in the table below may also be melted and obtained in the form of a ribbon of glass using the float technique and may be used for producing fireproof glazing panels meeting the conditions of the G fire-resistance classes. The glass compositions given in this table have an even higher (Littleton) softening point compared to the previous compositions, thereby further improving the fire resistance.

| | | | |
|---|---|---|---|
| SiO$_2$ | 70 | 66.1 | 65.6 |
| Al$_2$O$_3$ | 0 | 0.5 | 0.5 |
| ZrO$_2$ | 3 | 6.5 | 6.5 |
| MgO | 2 | 1 | 2 |
| CaO | 6 | 7 | 5 |
| SrO | 8.5 | 7.5 | 9 |
| BaO | 0 | 0 | 0 |
| Na$_2$O | 5 | 5 | 5 |
| K$_2$O | 5.4 | 5.9 | 6.4 |
| Softening point, °C. | 811 | 825 | 821 |
| Strain point, °C. | 577 | 581 | 574 |
| Expansion coefficient or $\alpha_{20-300}$, °C.$^{-1}$ | 77.8 | 78 | 80 |
| Modulus of elasticity, 10$^3$ N/mm$^2$ | 75 | 76.7 | 76 |
| φ coefficient, N/(mm$^2$·°C.) | 0.75 | 0.77 | 0.78 |
| T$_{logη}$ = 3.5, °C. | 1182 | 1197 | 1191 |
| T$_{logη}$ = 3.5, °C. | 1528 | 1522 | 1515 |

The second series of examples relates more particularly to glass compositions intended for manufacturing substrates for plasma screens. These examples are combined in the table attached as an annex.

This table gives, for each of these examples, the chemical formulations with the contents expressed in percentages by weight, the values of the φ coefficient expressed in N/(mm$^2$·°C.), the strain-point temperature values of the glasses T$_{sp}$, the thermal expansion coefficients $\alpha(_{25-300}$° C.) of the glasses in °C.$^{-1}$, the log of their resistivities log p in ohm.cm, their liquidus temperatures T$_{liq}$, their temperatures at viscosities, in poise, corresponding respectively to logη=2 and logη=3.5, T$_{logη=2}$ and T$_{logη=3.5}$. All temperatures are expressed in degrees Celsius.

From the tests carried out and/or given in the annex, and more particularly from the last three lines, when the measurements were made, which indicate temperatures corresponding, in respect of the first, to the viscosity T$_{logη=2}$, which is the temperature in the melting bath, in respect of the second, to the viscosity T$_{logη=3.5}$, which is the chosen entry temperature of the glass on the bath of molten metal, and finally, in respect of the third, to the liquidity, it is firstly verified that the glasses according to the invention may be melted in a melting furnace and that their forming on a bath of tin poses no problem.

It was thus possible to obtain glasses according to the invention, using the float technique in the form of a ribbon having a controlled thickness, which may vary from 0.5 to 10 mm. Sheets of glass were then cut to the desired format and subjected to a heat treatment whose purpose was to stabilize the dimensions of the said sheets. Next, layers were deposited on these sheets, such as those leading to the production of plasma screens.

First of all, the substrates exhibited quite satisfactory thermal stability. Moreover, during the layer-deposition treatments, no break of the said substrates occurred.

The glass compositions thus presented according to the invention therefore meet the stipulated requirements, that is to say that they make it possible to produce substrates or plates which are thermally stable and have an increased thermal-break resistance over the glasses already known.

| Composition | 1 | 2 | 3 | 4 | 5 | 6 | 7 | 8 | 9 | 10 | 11 | 12 |
|---|---|---|---|---|---|---|---|---|---|---|---|---|
| ANNEX | | | | | | | | | | | | |
| $SiO_2$ | 68 | 65 | 64.5 | 65 | 67.5 | 64.5 | 66 | 65 | 69 | 67.5 | 69.5 | 70 |
| $Al_2O_3$ | 0 | 0 | 1 | 1 | 1 | 1 | 0 | 1 | 0 | 0 | 1 | 0.5 |
| $ZrO_2$ | 4 | 7.5 | 7 | 6 | 3 | 6.5 | 6.5 | 6.5 | 4 | 4.5 | 3 | 3 |
| $Na_2O$ | 5 | 5 | 5 | 5.5 | 5 | 7.5 | 7 | 9 | 6 | 5 | 6.5 | 6.5 |
| $K_2O$ | 7.5 | 7.5 | 7.5 | 7.5 | 7 | 5.5 | 4.5 | 4 | 4 | 6 | 3.5 | 3.5 |
| CaO | 11 | 11 | 11 | 10.5 | 10.5 | 10 | 11 | 9.5 | 11 | 11 | 11 | 11 |
| MgO | 0.5 | 0 | 0 | 0 | 1.5 | 2 | 2 | 2 | 2 | 2 | 2 | 1.5 |
| BaO | 0 | 0 | 0 | 0 | 1.5 | 0 | 0 | 0 | 0 | 0 | 0 | 0 |
| SrO | 4 | 4 | 4 | 3.5 | 4 | 3 | 3 | 3 | 4 | 3.5 | 3.5 | 4 |
| ø | 0.75 | 0.79 | 0.79 | 0.79 | 0.75 | 0.79 | 0.8 | 0.8 | 0.74 | 0.76 | 0.75 | 0.73 |
| $T_{s.p.}$ | 580 | 583 | 581 | 582 | 573 | 567 | 570 | 558 | — | — | — | — |
| $log\rho_{(250°C.)}$ | — | — | — | — | — | 7.9 | — | — | — | — | — | — |
| α | 82 | 81 | 81 | 81 | 81 | 79.8 | 80.1 | 83.2 | 78.1 | 77.4 | 73.1 | 75.5 |
| $T_{log\eta-2}$ | 1496 | 1491 | 1497 | 1491 | 1498 | 1500 | 1490 | 1480 | 1490 | 1485 | 1500 | 1498 |
| $T_{log\eta-3.5}$ | 1171 | 1186 | 1189 | 1186 | 1171 | 1185 | 1175 | 1170 | 1170 | 1173 | 1180 | 1169 |
| $T_{liq}$ | — | — | — | — | — | 1120 | 1140 | 1090 | — | — | — | — |

"—": value not measured

What is claimed is:

1. A silica-soda-lime glass composition comprising the following components:

| | |
|---|---|
| $SiO_2$ | 55–75% |
| $Na_2O$ | 2–8% |
| CaO | 7–12% |
| $Al_2O_3$ | 0–7% |
| $ZrO_2$ | 0–8% |
| $K_2O$ | 0–8% |
| MgO | 0–5% |
| $B_2O_3$ | 0–3% | wherein the glass composition has a ø coefficient of between 0.5 and 0.85 N/(mm$^2$·° C.), a working point of less than 1200° C., a thermal expansion coefficient $\alpha_{20-300}$ of between 60 and 88×10$^{-7}$ C.$^{-1}$ and a strain point of greater than 570° C.

2. The composition of claim 1 which has a softening point of greater than 750° C.

3. The composition of claim 1, wherein the working point is less than 1190° C., the softening point is at least 805° C., the thermal expansion coefficient is between 75.6 and 85×10$^{-7}$ C.$^{-1}$ and the strain point is between 580 and 590° C.

4. The composition of claim 1 wherein the ø coefficient satisfies the relationship $$0.7 \text{ MPa}^2/° C.^2 < ø^2 \cdot c/a < 2 \text{ MPa}^2/° C.^2.$$

5. The composition of claim 1, comprising the following components:

| | |
|---|---|
| $SiO_2$ | 55–75% |
| $Na_2O$ | 5–8% |
| CaO | 8—12% |
| $Al_2O_3$ | 0–7% |
| $ZrO_2$ | 0–8% |
| $K_2O$ | 0–8%. |

6. The composition of claim 1, comprising the following components:

| | |
|---|---|
| $SiO_2$ | 55–75% |
| $Na_2O$ | 2–8% |
| $K_2O$ | 2–8% |
| CaO | 7–11% |
| $Al_2O_3$ | 0–7% |
| $ZrO_2$ | 0–8% |
| MgO | 0–5%. |

7. The composition of claim 1 comprising the following components:

| | |
|---|---|
| $SiO_2$ | 55–75% |
| $ZrO_2$ | 3–8% |
| $Na_2O$ | 4.5–8% |
| $K_2O$ | 3.5–7.5% |
| CaO | 7–11% |
| $Al_2O_3$ | 0–5%. |

8. The composition of claim 1, comprising the following components:

| | |
|---|---|
| $SiO_2$ | 64.5–75% |
| $ZrO_2$ | 3–7.5% |
| $Na_2O$ | 5–8% |
| $K_2O$ | 3.5–7.5% |
| CaO | 7–11% |
| SrO | 3–7% |
| $Al_2O_3$ | 0–1% |
| MgO | 0–2% |
| BaO | 0–1.5%. |

9. The composition of claim 1, wherein ø is between 0.75 and 0.84, and having an electrical resistivity such that log $\rho_{(250°)}$ is greater than 6.6.

10. The composition of claim 9 wherein the electrical resistivity is such that log $\rho_{(250°)}$ is greater than 8.

11. An article comprising the glass composition of claim 1.

12. The article of claim 11 in the form of a monolithic glazing panel, a plasma-screen substrate, an electroluminescent-screen or a cold-cathode-screen substrate.

13. The composition of claim 1, wherein the sum of the $SiO_2$, $ZrO_2$, and $Al_2O_3$ contents is from 71.5% to 75% by weight.

* * * * *